United States Patent [19]
Pfister

[11] 3,835,167
[45] Sept. 10, 1974

[54] ANTHRONE CARBOXYLIC ACIDS AND DERIVATIVES
[75] Inventor: Jurg R. Pfister, Los Altos, Calif.
[73] Assignee: Syntex (U.S.A.) Inc., Palo Alto, Calif.
[22] Filed: Dec. 18, 1972
[21] Appl. No.: 315,858

[52] U.S. Cl.............. 260/351, 424/308, 424/309, 424/311, 424/316, 424/317, 424/319, 424/321, 424/324
[51] Int. Cl............................................. C07c 63/44
[58] Field of Search.................................... 260/351

[56] References Cited
FOREIGN PATENTS OR APPLICATIONS
637,093    5/1950   Great Britain..................... 260/351

Primary Examiner—Lorraine A. Weinberger
Assistant Examiner—E. Jane Skelly
Attorney, Agent, or Firm—Walter H. Drager; Gerard A. Blaufarb; William B. Walker

[57] ABSTRACT

Compositions containing and methods employing, as the essential ingredient, anthrone carboxylic acid compounds which are useful in the treatment of allergic conditions. Methods for preparing these compounds and compositions are also disclosed. Anthrone-2-carboxylic acid and 7-methoxyanthrone-2-carboxylic acid are illustrated as representative of the class.

10 Claims, No Drawings

ANTHRONE CARBOXYLIC ACIDS AND DERIVATIVES

The present invention is directed to anthrone carboxylic acid compounds and to compositions containing and methods utilizing these compounds as the essential ingredient in the treatment of symptoms associated with allergic manifestations, for example, asthmatic conditions.

In a first aspect, the present invention relates to novel anthrone carboxylic acid compounds selected from those represented by the following formulas:

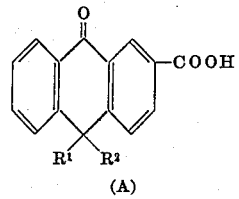 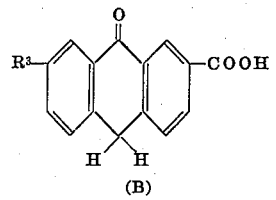

(A)      (B)

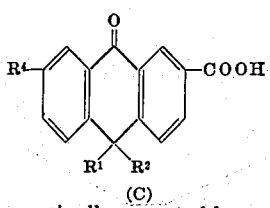

(C)

and the pharmaceutically acceptable, non-toxic esters, amides and salts thereof; wherein one of $R^1$ and $R^2$ is hydrogen and the other of $R^1$ and $R^2$ is a lower alkyl group or each of $R^1$ and $R^2$ is a lower alkyl group or $R^1$ and $R^2$ taken together is ethylene, 1,3-propylene, 1,4-butylene, or 1,5-pentylene;

$R^3$ is lower alkyl, lower alkoxy, cycloalkyl, cycloalkoxy, hydroxy or a conventional ester thereof, mercapto, lower alkylthio, trifluoromethyl, or a group of the formulas:

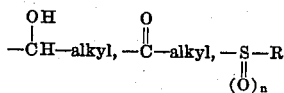

in which $n$ is the integer 1 or 2, R is lower alkyl when $n$ is 1 and R is lower alkyl, hydroxy, amino, monolower alkylamino, or dilower alkylamino when $n$ is 2; and $R^4$ is hydrogen, halo, or a group defined by $R^3$.

In the above depicted formulas, "alkyl" is lower alkyl.

In a second aspect, the present invention is directed to a method useful for relieving symptoms associated with allergic manifestations such as are brought about by antigen-antibody (allergic) reactions. In the relief of these symptoms, the method hereof serves to inhibit the effects of the allergic reaction when administered in an effective amount. While not intending to be bounded by any theoretical mechanism of action, the method hereof is believed to operate by inhibiting the release and/or the action of toxic products, e.g., histamine, 5-hydroxytryptamine, slow releasing substance (SRS-A), and others, which are produced as a result of a combination of specific antibody and antigen (allergic reaction). These properties make the subject compounds particularly useful in the treatment of various allergic conditions.

The compounds of the present invention are also smooth muscle relaxants, e.g., bronchial dilators, and are therefore useful in the treatment of conditions in which such agents may be indicated, as for instance in the treatment of broncho constriction. The compounds of the present invention are also vasodilators and are therefore useful in the treatment of conditions in which such agents may be indicated, as for instance in renal and cardiac disorders.

This aspect of the present invention thus relates to a method useful for inhibiting the effects of the allergic reaction and for the treatment of bronchopulmonary disorders which comprises administering an effective amount of a compound selected from those represented by the above formulas (A), (B), and (C) and the pharmaceutically acceptable non-toxic esters, amides and salts thereof; or a pharmaceutically acceptable non-toxic composition incorporating said compounds, esters, amides or salts as an essential ingredient.

The present invention, in a third aspect, is directed to pharmaceutical compositions useful for inhibiting the effects of the allergic reaction and for the treatment of bronchopulmonary disorders comprising an effective amount of a compound selected from those represented by the above formulas (A), (B) and (C) and the pharmaceutically acceptable esters, amides, and salts thereof; in admixture with a pharmaceutically acceptable non-toxic carrier.

In the practice of the method of the present invention, an effective amount of a compound of the present invention or pharmaceutical compositions thereof, as defined above, is administered via any of the usual and acceptable methods known in the art, either singly or in combination with another compound or compounds of the present invention or other pharmaceutical agents, such as antibiotics, hormonal agents, and so forth. These compounds or compositions can thus be administered orally, topically, parenterally, or by inhalation and in the form of either solid, liquid, or gaseous dosages including tablets, suspensions and aerosols, as discussed in more detail hereinafter. The administration can be conducted in single unit dosage form with continuous therapy or in single dose therapy ad libitum. In the preferred embodiments, the method of the present invention is practiced when relief of symptoms is specifically required, or perhaps, imminent; however, the method hereof is also usefully practiced as continuous or prophylatic treatment.

In view of the foregoing as well as in consideration of the degree of severity of the condition being treated, age of subject, and so forth, all of which factors being determinable by routine experimentation by one skilled in the art; the effective dosage in accordance herewith can vary over a wide range. Generally, an effective amount ranges from about 0.005 to about 100 mg. per kg. of body weight per day and preferably from about 0.01 to about 100 mg. per kg. of body weight per day. In alternate terms, an effective amount in accordance herewith generally ranges from about 0.5 to about 7000 mg. per day per subject.

Useful pharmaceutical carriers for the preparation of the compositions hereof, can be solids, liquids, or gases. Thus, the compositions can take the form of tablets, pills, capsules, powders, sustained release formulations, solutions, suspensions, elixirs, aerosols, and the like. The carriers can be selected from the various oils including those of petroleum, animal, vegetable, or synthetic origin, for example, peanut oil, soybean oil, mineral oil, sesame oil, and the like. Water, saline, aqueous dextrose, and glycols are preferred liquid carriers, particularly for injectable solutions. Suitable pharmaceutical excipients include starch, cellulose, talc, glucose, lactose, sucrose, gelatin, malt, rice, flour, chalk, silica gel, magnesium carbonate, magnesium stearate, sodium stearate, glyceryl monostearate, sodium chloride, dried skim milk, glycerol, propylene glycol, water, ethanol, and the like. Suitable pharmaceutical carriers and their formulation are described in "Remingtons Pharmaceutical Sciences" by E.W. Martin. Such compositions will, in any event, contain an effective amount of the active compound together with a suitable amount of carrier so as to prepare the proper dosage form for proper administration to the host.

The compounds of the present invention demonstrate activity as inhibitors of the effects of the allergic reaction as measured by tests indicative of such activity involving passive cutaneous anaphylaxis as substantially described, for example, by J. Goose et al., *Immunology*, 16, 749 (1969).

The compounds of the present invention demonstrate bronchopulmonary activity as measured by tests indicative of such activity involving the isolated tracheal chain assay as substantialy described, for example, by J.C. Castillo et al., *Journal of Pharmacology and Experimental Therapeutics*, Vol. 90, page 104 (1947) and the histamine aerosol bronchoconstriction assay as substantially described, for example, by O. H. Siegmund et al., *Journal of Pharmacology and Experimental Therapeutics*, Vol. 90, page 254 (1947).

Certain of the compounds of the present invention can be prepared in accordance with the following reaction sequence:

SEQUENCE A

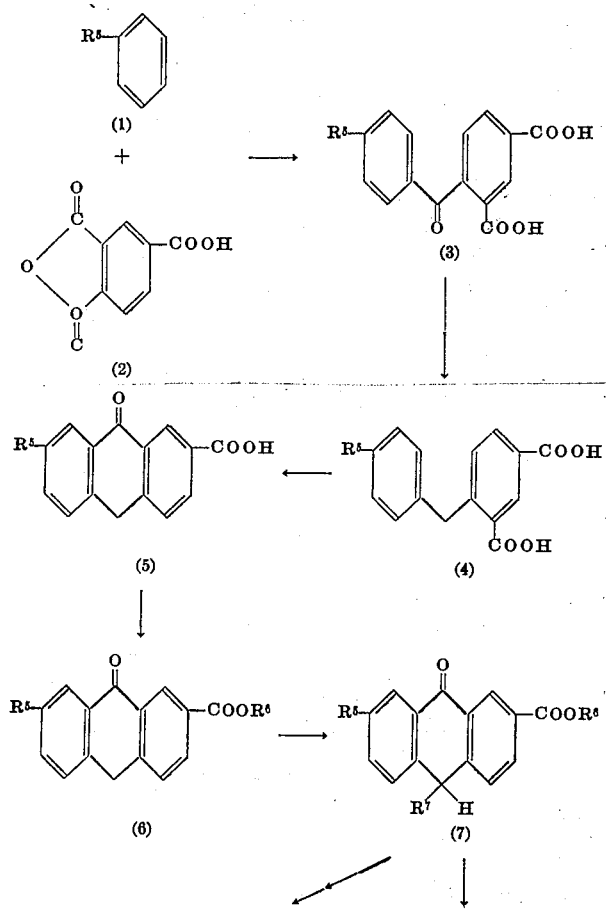

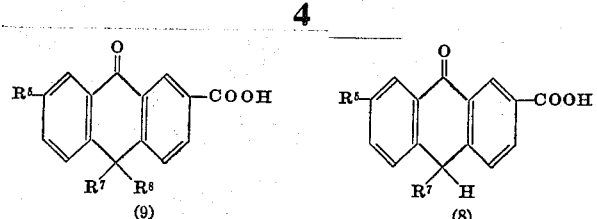

wherein $R^5$ is hydrogen, alkyl, alkoxy, cycloalkyl, cycloalkoxy, hydroxy, mercapto, or alkylthio;

$R^6$ is lower alkyl, preferably methyl; and each of $R^7$ and $R^8$ is alkyl or $R^7$ and $R^8$ taken together is ethylene, 1,3-propylene, 1,4-butylene, or 1,5-pentylene.

With reference to the above reaction sequence, benzene or a substituted ($R^5$) benzene (1) is reacted with trimellitic anhydride (2) in the presence of aluminum chloride to prepare the corresponding 1,3-dicarboxy-4-benzoyl- or -substituted ($R^5$) benzoyl-benzene compound (3). The reaction is conducted at from about 20 to about 100°C. for a period of time of from about 2 hours to about 8 hours and optionally in the presence of a solvent such as nitrobenzene, 1,2-dichloroethane, and dichloromethane. The reaction is preferably conducted employing an excess of benzene reactant (1) per molar amount of reactant (2) and from about 3 to 5 moles of aluminum chloride per mole of reactant (2).

The thus produced compound (3) is then reduced with excess (based upon the molar amount of compound (3)) zinc dust in refluxing sodium hydroxide solution and in the presence of catalytic amounts of copper sulfate to give the diphenylmethane-2,4-dicarboxylic acid compound (4). This reduction can also be conducted using hydroiodic acid and red phosphorous in refluxing acetic acid.

The thus prepared diacid compound (4) is then cyclized with phosphoryl chloride, thionyl chloride, sulfuric acid, hydrogen fluoride, or, preferably, polyphosphoric acid (PPA), to give the corresponding unsubstituted or -substituted anthrone-2-carboxylic acid compound (5). The reaction is preferably, but optionally, conducted in an inert organic reaction medium including those usually employed in organic chemical reactions, such as dimethylsulfoxide, sulfolane, benzene, toluene, and so forth. The reaction is further conducted at temperatures ranging from about 60° to about 180°C, and for a period of time sufficient to complete the reaction ranging from about 15 minutes to about 90 minutes.

Although the reaction consumes the reactants on the basis of one mole of compound (4) per mole of cyclizing reagent, the reaction can be performed using any proportions of reactants. In the preferred embodiments, however, the reaction is conducted using from about 20 to about 50 moles of the cyclizing reagent per mole of starting compound (4).

The thus prepared anthrone-2-carboxylic acid (5) is then esterified via conventional procedures such as by treatment with the desired alkyl iodide in the presence of lithium carbonate in dimethylformamide or with the desired alkanol in the presence of a trace of sulfuric acid at reflux temperature to give compound (6).

The thus prepared ester (6) is alkylated stepwise, if desired, to give the 10-alkyl ($R^7$) or 10, 10-dialkyl ($R^7$, $R^8$) compounds. This reaction is conducted by treatment of the ester (6) with lithium methoxide in toluene, followed by an alkyl halide, preferably iodide, to give the 10-monoalkyl ($R^7$) compounds (7). Treatment of these compounds, if desired, as above described affords the 10,10-dialkyl ($R^7$, $R^8$) compounds. By use of 2 equivalents of lithium methoxide followed by treatment with an $\alpha,\omega$-dihaloalkane, e.g., ethylene 1,2-dibromide, the 10,10-alkylene ($R^7$ and $R^8$ taken together) compounds are prepared.

Thereafter, the thus prepared compounds are base hydrolyzed to give the corresponding 5-alkyl-, 5,5-dialkyl-, and 5,5-alkylene-7-unsubstituted or 7-substituted anthrone-2-carboxylic acid compounds (8) and (9). The base hydrolysis conditions can be any employed conventionally in the art. Generally, the hydrolysis reaction is conducted using an alkali metal hydroxide at about 50° to about 90°C and for a period of time sufficient to complete the reaction, ranging from about 15 minutes to about 60 minutes, preferably in the presence of inert organic reaction media such as those normally employed in organic chemical reactions of this type, e.g., aqueous alkanol solutions.

Alternative to the above described method, the 7-lower alkoxy- or lower alkylthioanthrone-2-carboxylic acid compounds can also be prepared by following the above-indicated sequence with a p-methoxy- or methylthiobenzene (1), cleaving the methoxy (methylthio) substituted product with hydrobromic or hydriodic acid and acetic acid, followed by treatment of the thus prepared 7-hydroxy (mercapto) compound with a lower alkyl halide in the presence of base followed by base treatment.

The conventional esters of the thus prepared hydroxy compounds (8), (9) are conventionally prepared by means known to those skilled in the art, for example, by treatment of the hydroxy compound with lower alkanoyl chloride in the presence of benzene or with carboxylic anhydride in pyridine.

Hydrolysis of the acid ester, as described above affords the 7-(lower alkylthio)-acid compounds via an alternative manner.

Certain of the compounds of the present invention can be prepared in accordance with the following reaction Sequence B:

SEQUENCE B

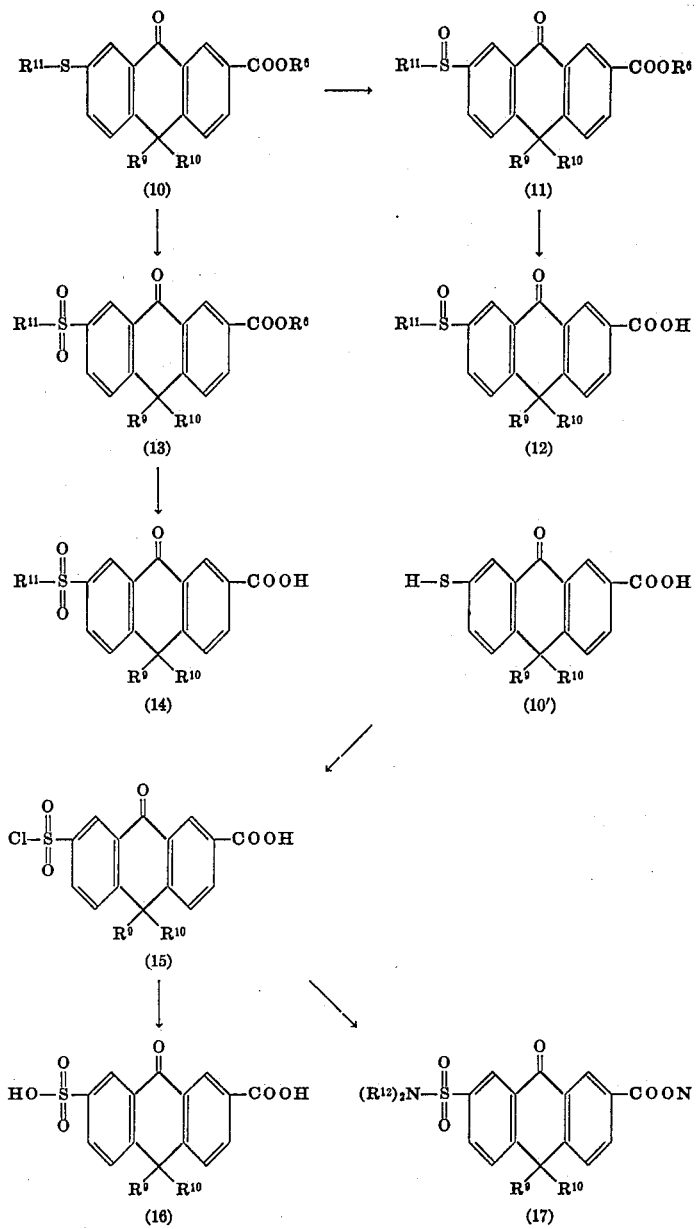

wherein each of $R^9$ and $R^{10}$ is hydrogen, alkyl, or when taken together ethylene, 1,3-propylene, 1,4-butylene, or 1,5-pentylene;

$R^6$ is as above defined; and each of $R^{11}$ and $R^{12}$ is lower alkyl.

With reference to the above reaction sequence, compounds (10) and (10') are the 7-alkylthio and 7-mercapto compounds, respectively, prepared as described and depicted above by Formulas (6), (8) and (9) wherein $R^5$ is lower alkylthio or by the alternative manner as described above from the 7-hydroxyanthrone-2-carboxylic acid compounds. Compounds (10) can be oxidized with a peracid, such as peracetic acid, m-chloroperbenzoic acid, p-nitroperbenzoic acid, perphthalic acid, and so forth, to give compounds (11) which can be hydrolyzed, as above described, to give the corresponding 7-lower alkylsulfinyl acid compounds (12). The oxidation is preferably conducted in liquid reaction media such as a chlorinated hydrocarbon, e.g., chloroform, methylene chloride, and carbon tetrachloride. The reaction is conducted at temperatures ranging from about 0° to about 60°C, preferably from 20° to about 30°C and for a period of time sufficient to complete the reaction, ranging from about 1 hour to about 6 hours. In the preferred embodiments, the reaction is conducted by reaction of from about 1 to about 1.1 moles of peracid.

Alternatively, compounds (10) are oxidized with excess hydrogen peroxide to give compounds (13) which can be hydrolyzed as above described to give the 7-lower alkylsulfonyl acid compounds (14). The peroxide oxidation is preferably conducted in liquid reaction media as a lower carboxylic acid, e.g., acetic acid and propionic acid. The reaction is further conducted at temperatures ranging from about 20° to about 100°C, preferably from 80° to about 90°C and for a period of time sufficient to complete the reaction, ranging from about 30 minutes to about 3 hours. In the preferred embodiments, the reaction is conducted by reaction of from about 5 to about 10 moles of hydrogen peroxide per mole of compound (10).

In said oxidation steps, and particularly that employing peracid, a mixture of products (11) and (13) may be obtained. If obtained, the mixture can be conventionally separated, such as via chromatography, if desired, to isolate the oxidized products.

The above oxidation steps can also be practiced on the 2-carboxylic acid compounds corresponding to compounds (10) to give respective products (12) and (14) without the need of a second hydrolysis step.

Compounds (10') can be treated with excess chlorine under acedic conditions to afford compounds (15). This reaction is conducted employing a pH of about 1 by use of hydrochloric acid, optionally in acetic acid solution. The reaction is further conducted at temperatures ranging from about 20° to about 100°C, preferably from 50° to about 60° C and for a period of time sufficient to complete the reaction, ranging from about 2 hours to about 12 hours.

Compounds (15) is then reacted with a base, such as alkali metal hydroxide, preferably under aqueous conditions and at a temperature ranging from about 20° to about 100°C, preferably from 80° to about 90°C and for a period of from about 1 hour to about 2 hours to give the 7-sulfo-substituted acid compounds (16).

Compounds (15) can be treated with ammonia, monolower alkylamine, or dilower alkylamine to give the 7-sulfamoyl, monolower alkylsulfamoyl, and dilower alkylsulfamoyl acid compounds (17). This reaction is conducted at temperatures ranging from about 0° to about 80°C, preferably from 20° to about 30°C, and for a period of time sufficient to complete the reaction, ranging from about 1 hour to about 8 hours. In the preferred embodiments, the reaction is conducted by reaction of from about 10 to about 20 moles of amine per mole of compounds (15). This reaction is further conducted in organic reaction media such as those described above, preferably tetrahydrofuran, dioxane, dimethylsulfoxide, and so forth.

The C-7 chlorosulfonylanthrone-2-carboxylic acid compounds (15) are novel intermediates useful as described above.

Certain of the compounds of the present invention can be prepared by the following reaction sequence:

SEQUENCE C

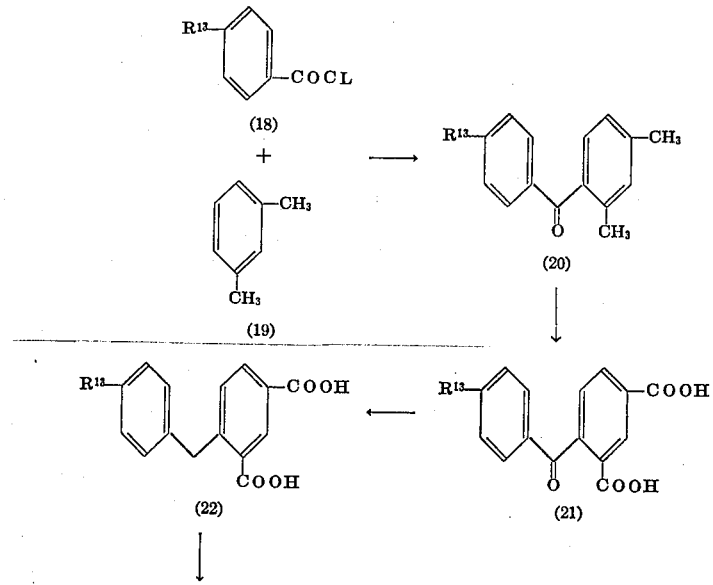

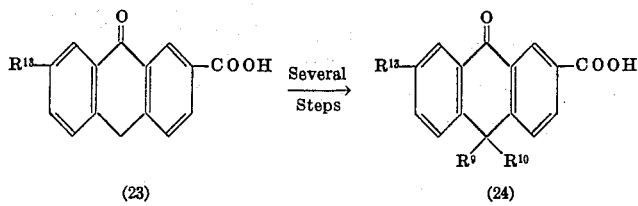

wherein each of $R^9$ and $R^{10}$ is as above defined and $R^{13}$ is halo or trifuloromethyl.

With reference to the above reaction sequence, a substituted ($R^{13}$) benzoyl chloride (18) is reacted with 1,3-dimethylbenzene (19) in the presence of aluminum chloride to give the 1,3-dimethyl-4-(substituted benzoyl)-benzene compound (20). The reaction is conducted at from 20° to about 60°C and for a period of time of from about 2 hours to about 8 hours. The reaction is preferably conducted in an organic solvent such as nitrobenzene, 1,2-dichloroethane, or methylene chloride. Preferably about 1.1 moles of 1,3-dimethylbenzene and about 1.1 to 1.5 moles of aluminum chloride compound, are used.

The thus prepared compound is then oxidized such as with potassium permanganate in aqueous t-butanol to give the corresponding dicarboxy compound (21). This compound is then reduced, as described above (3 → 4), to give compound (22) and this cyclized, as described above (4 → 5) to give the 7-substituted anthrone-2-carboxylic acid compounds (23). Thereafter, as described above

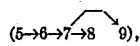

the 5-alkyl, 5,5-dialkyl, and 5,5-alkylene groups are optionally introduced to give the compounds depicted by formula (24).

Certain of the compounds of the present invention can be prepared as follows:

SEQUENCE D wherein each of $R^9$ and $R^{10}$ is as above defined.

With reference to the above reaction sequence, a 7-bromoanthrone-2-carboxylic acid (25), prepared as described in Sequence C, is refluxed with cuprous cyanide in dimethylformamide for from about 4 hours to about 8 hours to give the 7-cyano compound (26). The cyano compound is then refluxed with thionyl chloride under conditions known per se to give the acid chloride (27) which is reacted with a dialkyl cadmium compound at a temperature of from about 0° to about 30°C and for from about 2 hours to about 16 hours in the presence of organic medium such as tetrahydrofuran to give the 7-acylanthrone-2-cyanide compound (28). The thus prepared compound is base hydrolyzed, as described above (e.g., 7 → 8), to give the 7-acylanthrone-2-carboxylic acid products (29).

Thereafter, the acid (29) is optionally reduced by use of sodium borohydride in aqueous tetrahydrofuran under conditions known per se to give the 7-(1-hydroxyalkyl) compounds (30).

The acid esters of the anthrone-2-carboxylic acids hereof are prepared upon treatment of the acid with ethereal diazoalkane such as diazomethane and diszoethane or with the desired lower alkyl iodide in the presence of lithium carbonate at room temperature or with the desired lower alkanol in the presence of a trace of sulfuric acid at reflux. The glycerol esters are prepared by treating the acid with thionyl chloride followed by treatment with a suitably protected ethylene glycol or propylene glycol (e.g., solketal) in pyridine, and hydrolyzing the protecting group of the esters thus formed with dilute acid.

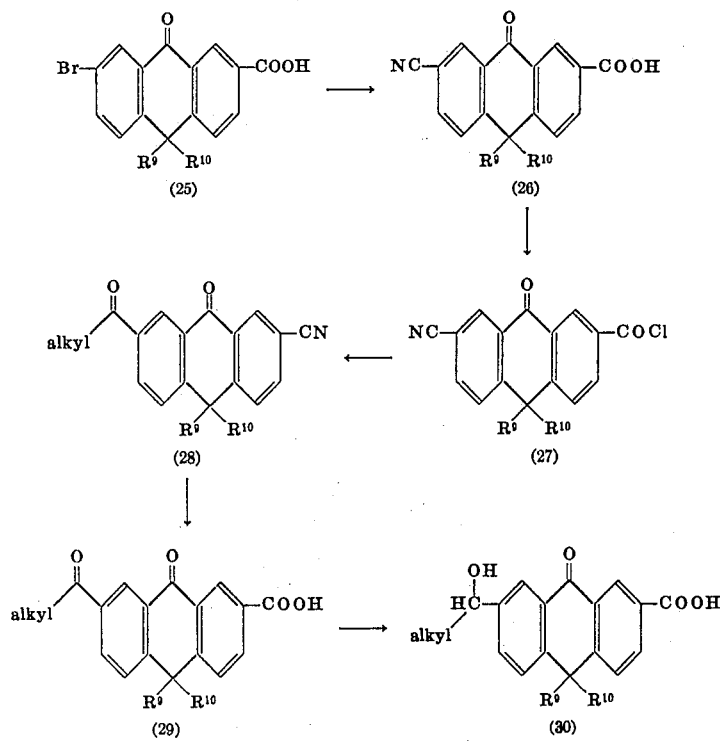

The amides of the anthrone-2-carboxylic acids hereof are prepared by treatment of the acids with thionyl chloride followed by treatment with anhydrous ammonia, alkyl, amine, dialkyl amine, dialkylaminoalkylamine, alkoxyalkylamine, or phenethylamine.

The salts of the anthrone-2-carboxylic acids hereof are prepared by treating the corresponding acids with pharmaceutically acceptable base. Representative salts derived from such pharmaceutically acceptable bases are sodium, potassium, lithium, ammonia, calcium, magnesium, ferrous, ferric, zinc, maganous, aluminum, manganic, the salts of trimethylamine, triethylamine, tripropylamine, $\beta$-(dimethylamino)ethanol, triethanolamine, $\beta$-(diethylamino)ethanol, arginine, lysine, histidine, N-ethylpiperidine, hydrabamine, choline, betaine, ethylenediamine, glucosamine, methyl glucamine, theobromine, purines, piperazine, piperidine, polyamine resins, caffeine, procaine or the like. The reaction is conducted in an aqueous solution, alone or in combination with an inert, water miscible organic solvent, at a temperature of from about 0°C to about 100° C preferably at room temperature. Typical inert, water miscible organic solvents include methanol, ethanol, isopropanol, butanol, acetone, dioxane, or tetrahydrofuran. When divalent metal salts are prepared, such as the calcium salts or magnesium salts of the acids the free acid starting material is treated with about one half molar equivalent of pharmaceutically acceptable base. When the aluminum salts of the acids are prepared, about one third molar equivalent of the pharmaceutically acceptable base are employed.

In the preferred embodiment of the present invention, the calcium salts and magnesium salts of the acids are prepared by treating the corresponding sodium or potassium salts of the acids with at least one half molar equivalent of calcium chloride or magnesium chloride, respectively, in an aqueous solution, alone or in combination with an inert water miscible organic solvent at a temperature of from about 20°C to about 100°C.

In the preferred embodiment of the present invention, the aluminum salts of the acids are prepared by treating the acids with at least one third molar equivalent of an aluminum alkoxide, such as aluminum triethoxide, aluminum tripropoxide and the like, in a hydrocarbon solvent, such as benzene, xylene, cyclohexane, and the like, at a temperature of from 20°C to about 115°C.

In the present specification and claims, by the term "lower alkyl" is intended a lower alkyl group containing one to five carbon atoms including straight and branched chain groups and cyclic alkyl groups, for example, methyl, ethyl, n-propyl, isopropyl, n-butyl, isobutyl, sec-butyl, t-butyl, n-pentyl, isopentyl, and sec-pentyl. By the term "lower alkoxy" is intended the group "O-lower alkyl" wherein "lower alkyl" is as defined above. By the term "cycloalkyl" is meant a cycloaliphatic group of 3 to 6 carbon atoms. By the term "cycloalkoxy" is meant "-O-cycloalkyl," wherein "cycloalkyl" is as above defined. The conventional esters of the hydroxy group of the present invention include those conventionally prepared and known in the art. These hydrolyzable carboxylic esters are derived from both substituted and unsubstituted (hydrocarbon) carboxylic acids. These acids can be completely saturated or possess carying degrees of unsaturation (including aromatic), can be of straight chain, branched chain, or cyclic structure, and preferably contain from 1 to 12 carbon atoms. In addition, they can be substituted by functional groups, for example, hydroxy, alkoxy containing up to six carbon atoms, acyloxy containing up to 12 carbon atoms, nitro, amino, halogeno, and the like, attached to the hydrocarbon backbone chain. Typical ester groups include acetate, propionate, butyrate, trimethylacetate, valerate, methylethylacetate, caproate, t-butylacetate, pelargonate, decanote, undecanoate, benzoate, phenylacetate, diphenylacetate, cyclopentylpropiionate, methoxyacetate, aminoacetate, diethylaminoacetate, trichloroacetate, $\beta$-chloropropionate, bicyclo-[2.2.2]-octane 1'-carboxylate, adamantoate, and the like.

By the term "pharmaceutically acceptable, non-toxic esters, amides, and salts" is respectively intended an alkyl or glycerol ester; an unsubstituted, monoalkyl, dialkyl, dialkylaminoalkyl, alkoxyalkyl, or phenethyl substituted amide and a salt as defined above.

The nomenclature herein is employed in accordance with *Chemical Abstracts*, 56, Subject Index (1962, January–June).

The following examples illustrate the method by which the present invention can be practiced.

EXAMPLE 1

To a suspension of 20 g. of trimellitic anhydride and 15 g. of benzene in 200 ml. of nitrobenzene are added 42 g. of aluminum chloride. After stirring at 60°C for 4 hours, the reaction mixture is decomposed by addition of ice and dilute hydrochloric acid and then subjected to a steam distillation to remove unreacted isopropylbenzene and nitrobenzene. The precipitate is filtered off, washed with water and recrystallized from ethanol/water to give 4-(benzoyl)-isophthalic acid.

A mixture of 28.3 g. of 4-(benzoyl)-isophthalic acid, 18.6 g. zinc dust and 500 mg. copper sulfate are refluxed with 35 g. potassium hydroxide in 250 ml. of water for 16 hours. After this period of time, the mixture is filtered to remove unreacted zinc and the filtrate is acidified to give 4-(benzyl)-isophthalic acid, which can be recrystallized from ethanol/water.

A mixture of 19.2 g. of 1,3-dicarboxy-4-benzylbenzene, 75 ml. of polyphosphoric acid, and 75 ml. of sulfolane is stirred at 125°C for a period of two hours. After this time, the reaction mixture is poured into water, filtered and the precipitate washed. The precipitate is recrystallized from acetic acid (charcoal) to give anthrone-2-carboxylic acid.

EXAMPLE 2

The procedures of Example 1 are repeated using a substituted benzene, in lieu of benzene in the procedure of paragraph 1 thereof, to give the following compounds:

7-methylanthrone-2-carboxylic acid
7-ethylanthrone-2-carboxylic acid
7-n-propylanthrone-2-carboxylic acid
7-isopropylanthrone-2-carboxylic acid
7-n-butylanthrone-2-carboxylic acid
7isobutylanthrone-2-carboxylic acid
7-sec-butylanthrone-2-carboxylic acid
7-t-butylanthrone-2-carboxylic acid
7-pentylanthrone-2-carboxylic acid
7-methoxyanthrone-2-carboxylic acid
7-ethoxyanthrone-2-carboxylic acid 7-n-propoxyanthrone-2-carboxylic acid
7-isopropoxyanthrone-2-carboxylic acid
7-n-butoxyanthrone-2-carboxylic acid
7-isobutoxyanthrone-2-carboxylic acid
7-sec-butoxyanthrone-2-carboxylic acid
7-t-butoxyanthrone-2-carboxylic acid
7-pentoxyanthrone-2-carboxylic acid
7-cyclopropylanthrone-2-carboxylic acid
7-cyclobutylanthrone-2-carboxylic acid
7-cyclopentylanthrone-2-carboxylic acid
7-cyclohexylanthrone-2-carboxylic acid
7-cyclopropoxyanthrone-2-carboxylic acid
7-cyclobutoxyanthrone-2-carboxylic acid
7-cyclopentyloxyanthrone-2-carboxylic acid
7-cyclohexyloxyanthrone-2-carboxylic acid
7-hydroxyanthrone-2-carboxylic acid
7-mercaptoanthrone-2-carboxylic acid
7-methylthioanthrone-2-carboxylic acid
7-methylthioanthrone-2-carboxylic acid
7-n-propylthioanthrone-2-carboxylic acid
7-isopropylthioanthrone-2-carboxylic acid
7-n-butylthioanthrone-2-carboxylic acid
7-isobutylthioanthrone-2-carboxylic acid
7-sec-butylthioanthrone-2-carboxylic acid
7-t-butylthioanthrone-2-carboxylic acid
7-pentylthioanthrone-2-carboxylic acid

EXAMPLE 3

This example illustrates the manner by which the esters of the 7-hydroxyanthrone-2-carboxylic acids are prepared.

A mixture of 2 grams of 7-hydroxyanthrone-2-carboxylic acid in 8 ml. of pyridine and 4 ml. of acetyl chloride is left at room temperature for 18 hours. The mixture is then poured into ice water and the solid which forms is collected by filtration, washed with water and dried to yield 7-acetoxyanthrone-2-carboxylic acid which is purified through recrystallization from acetic acid.

Upon substitution of the appropriate alkanoyl chloride in the above procedures, the other 7-esters can be prepared, e.g.

7-propionyloxyanthrone-2-carboxylic acid,
7-butryloxyanthrone-2-carboxylic acid,
7-trichloroacetoxyanthrone-2-carboxylic acid,
7-trimethylacetoxyanthrone-2-carboxylic acid,
7-heptanoyloxyanthrone-2-carboxylic acid,
7-pentanoyloxyanthrone-2-carboxylic acid,
7-(2-chloropropionyloxy)anthrone-2-carboxylic acid, and so forth.

EXAMPLE 4

A mixture of 11 grams of 7-methoxyanthrone-2-carboxylic acid in 100 ml. of concentrated aqueous hydrogen iodide and 100 ml. of acetic acid is refluxed for four hours. After this time, the mixture is cooled, diluted with water, and filtered. The precipitate is washed and dried to give 7-hydroxyanthrone-2-carboxylic acid.

7-hydroxyanthrone-2-carboxylic acid (1.3 g.) in 30 ml. of dimethylformamide containing 5 g. of n-propylbromide and 5 g. of potassium carbonate is stirred at 60°C for 18 hours. The reaction mixture is then acidified and the acidified mixture partially evaporated in vacuum to remove excess n-propylbromide. The mixture is then filtered and the filtered precipitate washed and then dissolved in 100 ml. of ethanol. Twenty milliliters of 2N sodium hydroxide is then added and the resultant mixture refluxed for 60 minutes. The mixture is then cooled, diluted with water, and filtered. The filtrate is acidified to give 7-n-propoxyanthrone-2-carboxylic acid which is recrystallized for ethanol-water.

In a similar manner, the other 7-lower alkoxy anthrone-2-carboxylic acid compounds prepared as described in Example 2 can be prepared by using, in this procedure, the appropriate lower alkyl bromide reagent.

EXAMPLE 5

A mixture of 3.5 grams of anthrone-2-carboxylic acid, 10 g. of methyl iodide, and 10 g. of lithium carbonate in 75 ml. of dimethylformamide is stirred at room temperature for a period of 18 hours. After this period of time, the reaction mixture is poured into dilute hydrochloric acid-ice and the resultant precipitate is filtered off and washed to give methyl anthrone-2-carboxylate.

Lithium metal (0.56 g.) is added to a mixture of 80 ml. toluene and 15 ml. methanol. After stirring at room temperature for 2 hours, 20.2 g. of methyl anthrone-2-carboxylate are added and the mixture is then stirred at 60° for 1 hour. The solvent is evaporated and the lithium salt heated with 25 ml. methyl iodide and 0.4 ml. t-butanol at 150° for 24 hours in a sealed tube. After cooling, most of the methyl iodide is distilled off, the residue taken up in ether, washed with water and the solvent evaporated. The residue is chromatographed on alumina and recrystallized from chloroform/ethanol to give methyl 10-methylanthrone-2-carboxylate.

Methyl 10-methylanthrone-2-carboxylate (4.5 g.) is combined with 150 ml. of 5 percent potassium hydroxide in methanol. The resultant mixture is refluxed for one hour after which time it is acidified, cooled and filtered, to give 10-methyl-anthrone-2-carboxylic acid.

Example 6

Methyl anthrone-2-carboxylate (5.04 g.) is stirred with lithium methoxide (prepared from 0.24 g. lithium metal and 10 ml. methanol) in 80 ml. toluene at 65°C for 3 hours. After removal of the methanol, 3.8 g. 1.2-dibromoethane are added and the mixture is refluxed for 7 hours. The cooled solution is washed with water, the solvent evaporated and the residue chromatographed to give methyl 10,10-ethylene-anthrone-2-carboxylate.

The thus prepared compound is hydrolyzed as described in Example 5 to give 10,10-ethyleneanthrone-2-carboxylic acid.

Likewise prepared through the respective methyl esters are 10,10-(1,3-propylene)-anthrone-2-carboxylic acid, 10,10-(1,4-butylene)-anthrone-2-carboxylic acid, and 10,10-(1,5-pentylene)-anthrone-2-carboxylic acid.

EXAMPLE 7

The procedures of example 5 are repeated using other alkyl iodide or bromide reagents, in lieu of methyl iodide, to give the following products:

10-ethylanthrone-2-carboxylic acid
10-n-propylanthrone-2-carboxylic acid
10-isopropylanthrone-2-carboxylic acid
10-n-butylanthrone-2-carboxylic acid
10-isobutylanthrone-2-carboxylic acid
10-sec-butylanthrone-2-carboxylic acid
10-t-butylanthrone-2-carboxylic acid
10-pentylanthrone-2-carboxylic acid

EXAMPLE 8

The procedures of examples 5, 6 and 7 are repeated using the products of example 2 above, in liew of anthrone-2-carboxylic acid, to give the corresponding 10-alkyl compounds thereof, to wit:

7,10-dimethylanthrone-2-carboxylic acid, 7-ethyl-10-methylanthrone-2-carboxylic acid,
7,10-dimethylanthrone-2-carboxylic acid, 7-n-propyl-10-methyl-anthrone-2-carboxylic acid,
7,10-dimethylanthrone-2-carboxylic acid, 7-isopropyl-10-methyl-anthrone-2-carboxylic acid,
7,10-dimethylanthrone-2-carboxylic acid, 7-n-butyl-10-methyl-anthrone-2-carboxylic acid,
7,10-dimethylanthrone-2-carboxylic acid, 7-isobutyl-10-methyl-anthrone-2-carboxylic acid,
7,10-dimethylanthrone-2-carboxylic acid, 7-sec-butyl-10-methyl-anthrone-2-carboxylic acid,
7,10-dimethylanthrone-2-carboxylic acid, 7-t-butyl-10-methyl-anthrone-2-carboxylic acid,
7,10-dimethylanthrone-2-carboxylic acid, 7-pentyl-10-methyl-anthrone-2-carboxylic acid,
7,10-dimethylanthrone-2-carboxylic acid, 7-methoxy-10-methyl-anthrone-2-carboxylic acid,
7,10-dimethylanthrone-2-carboxylic acid, 7-ethoxy-10-methyl-anthrone-2-carboxylic acid,
7,10-dimethylanthrone-2-carboxylic acid, 7-propoxy-10-methyl-anthrone-2-carboxylic acid,
7,10-dimethylanthrone-2-carboxylic acid, 7-isopropoxy-10-methyl-anthrone-2-carboxylic acid,
7,10-dimethylanthrone-2-carboxylic acid, 7-n-butoxy-10-methyl-anthrone-2-carboxylic acid,
7,10-dimethylanthrone-2-carboxylic acid, 7-isobutoxy-10-methyl-anthrone-2-carboxylic acid,
7,10-dimethylanthrone-2-carboxylic acid, 7-secbutoxy-10-methylanthrone-2-carboxylic acid,
7,10-dimethylanthrone-2-carboxylic acid, 7-t-butoxy-10-methylanthrone-2-carboxylic acid,
7,10-dimethylanthrone-2-carboxylic acid, 7-pentoxy-10-methylanthrone-2-carboxylic acid,
7,10-dimethylanthrone-2-carboxylic acid, 7-cyclopropyl-10-methylanthrone-2-carboxylic acid,
7,10-dimethylanthrone-2-carboxylic acid, 7-cyclobutyl-10-methylanthrone-2-carboxylic acid,
7,10-dimethylanthrone-2-carboxylic acid, 7-cyclopentyl-10-methylanthrone-2-carboxylic acid,
7,10-dimethylanthrone-2-carboxylic acid, 7-cyclohexyl-10-methylanthrone-2-carboxylic acid,
7,10-dimethylanthrone-2-carboxylic acid, 7-cyclopropoxy-10-methylanthrone-2-carboxylic acid,
7,10-dimethylanthrone-2-carboxylic acid, 7-cyclobutoxy-10-methylanthrone-2-carboxylic acid,
7,10-dimethylanthrone-2-carboxylic acid, 7-cyclopentyloxy-10-methylanthrone-2-carboxylic acid,
7,10-dimethylanthrone-2-carboxylic acid, 7-cyclohexyloxy-10-methylanthrone-2-carboxylic acid,
7,10-dimethylanthrone-2-carboxylic acid, 7-hydroxy-10-methylanthrone-2-carboxylic acid,
7,10-dimethylanthrone-2-carboxylic acid, 7-mercapto-10-methylanthrone-2-carboxylic acid,
7,10-dimethylanthrone-2-carboxylic acid, 7-methylthio-10-methylanthrone-2-carboxylic acid,
7,10-dimethylanthrone-2-carboxylic acid, 7-ethylthio-10-methylanthrone-2-carboxylic acid,
7,10-dimethylanthrone-2-carboxylic acid, 7-n-propylthio-10-methylanthrone-2-carboxylic acid,
7,10-dimethylanthrone-2-carboxylic acid, 7-isopropythio-10-methylanthrone-2-carbaoxylic acid,
7,10-dimethylanthrone-2-carboxylic acid, 7-n-butylthio-10-methylanthrone-2-carboxylic acid,
7,10-dimethylanthrone-2-carboxylic acid, 7-isobutylthio-10-methylanthrone-2-carboxylic acid,
7,10-dimethylanthrone-2-carboxylic acid, 7-sec-butylthio-10-methylanthrone-2-carboxylic acid,
7,10-dimethylanthrone-2-carboxylic acid, 7-t-butylthio-10-methylanthrone-2-carboxylic acid,
7,10-dimethylanthrone-2-carboxylic acid, 7-pentylthio-10-methylanthrone-2-carboxylic acid,
7,10-dimethylanthrone-2-carboxylic acid, 7-acetoxy-10-methylanthrone-2-carboxylic acid,
7,10-dimethylanthrone-2-carboxylic acid, 7-propionyloxy-10-methylanthrone-2-carboxylic acid,
7,10-dimethylanthrone-2-carboxylic acid, 7-butyryloxy-10-methylanthrone-2-carboxylic acid,
7,10-dimethylanthrone-2-carboxylic acid, 7-trichloroacetoxy-10-methylanthrone-2-carboxylic acid,
7,10-dimethylanthrone-2-carboxylic acid, 7-trimethylacetoxy-10-methylanthrone-2-carboxylic acid,
7,10-dimethylanthrone-2-carboxylic acid, 7-heptanoyloxy-10-methylanthrone-2-carboxylic acid,
7,10-dimethylanthrone-2-carboxylic acid, 7-pentanoyloxy-10-methylanthrone-2-carboxylic acid,
7,10-dimethylanthrone-2-carboxylic acid, 7-(2-chloropropionyloxy)-10-methylanthrone-2-carboxylic acid,
and the 44 compounds corresponding to the above in each of the 10-ethyl-, -n-propyl-, -isopropyl-, -n-butyl-, -isobutyl-, -sec-butyl-, -t-butyl-, -pentyl-, 10,10-ethylene, -1,3- propylene, 1,4-butylene, and 1,5-pentylene series.

EXAMPLE 9

Methyl 10-methylanthrone-2-carboxylate (10.6 g.) are added to a suspension of lithium methoxide (prepared from 0.28 g. lithium metal and 7 ml. methanol) in 45 ml. toluene. The mixture is stirred at 110°C for 3 hours and then evaporated under vacuum. The residue is transferred into a sealed tube and heated to 150°C in the presence of 12.5 ml. methyl iodide and 0.2 ml. t-butanol for 20 hours. After removal of most of the excess methyl iodide, the residue is dissolved in methylene chloride, washed with water and the solvent evaporated. Chromatography of the crude material thus obtained, followed by recrystallization from methanol gives methyl 10,10-dimethylanthrone-2-carboxylate.

Methyl 10,10-dimethylanthrone-2-carboxylate (8.2 g.) is combined with 150 ml. of 5 percent potassium hydroxide in methanol. The resultant mixture is refluxed for one hour after which time it is acidified, cooled, and filtered, to give 10,10-dimethylanthrone-2-carboxylic acid.

EXAMPLE 10

The procedures of example 9 are repeated using other alkyl iodides reagents, in lieu of methyl iodide, to give the following products:
10,10-diethylanthrone-2-carboxylic acid,
10,10-di-n-propylanthrone-2-carboxylic acid,
10,10-di-n-butylanthrone-2-carboxylic acid,
10,10-diisobutylanthrone-2-carboxylic acid,
10,10-di-sec-butylanthrone-2-carboxylic acid,
10,10-di-t-butylanthrone-2-carboxylic acid, and
10,10-dipentylanthrone-2-carboxylic acid.

EXAMPLE 11

The procedures of examples 9 and 10 are repeated on the products of examples 7 and 8 to get the corresponding compounds, to wit:
10-ethyl-10-methylanthrone-2-carboxylic acid,
10-isopropyl-10-methylanthrone-2-carboxylic acid,
7,10,10-trimethylanthrone-2-carboxylic acid,
10,10-dimethyl-7-isopropylanthrone-2-carboxylic acid,
10,10-dimethyl-7-isopropoxyanthrone-2-carboxylic acid,
10,10-diisopropyl-7-methylanthrone-2-carboxylic acid,
10,10-diisopropyl-7-isopropoxyanthrone-2-carboxylic acid,
7,10,10-triisopropylanthrone-2-carboxylic acid,
10,10-diisopropyl-7-methylthioanthrone-2-carboxylic acid, and so forth.

EXAMPLE 12

A mixture of 3g. of 7-mercaptoanthrone-2-carboxylic acid in 150 ml. of dimethylformamide, 5 ml. of methyl iodide and 5 ml. of potassium carbonate is stirred for 16 hours at 60°C. The mixture is then poured into dilute hydrochloric acid and the resultant mixture extracted with ethyl acetate. The extracts are chromatographed on alumina (methylene chloride) to give methyl 7-methylthioanthrone-2-carboxylate which can be recrystallized from methylene chloride/methanol.

A mixture of 580 mg. of methyl 7-methylthioanthrone-2-carboxylate, 30 ml. of ethanol, 5 ml. of saturated sodium carbonate solution and 5 ml. of water is refluxed for 1 hour. The mixture is then cooled, acidified and the precipitate filtered off to give 7-methylthioanthrone-2-carboxylic acid.

A mixtureof 0.8 g. of 7-mercaptoanthrone-2-carboxylic acid, 2 ml. of 2-bromopropane, and excess potassium carbonate in 50 ml. of dimethylformamide is stirred for 24 hours at 25°C. Dilute hydrochloric acid and ethanol are added, the solid filtered off and washed. The solid is saponified with sodium carbonate in aqueous methanol (30 minutes reflux). The alkaline solution is diluted with water, treated with charcoal, filtered, and acidified to give 7-(isopropylthio)-anthrone-2-carboxylic acid which can be recrystallized from tetrahydrofuran/ethyl acetate.

EXAMPLE 13

Methyl 7-methylthioanthrone-2-carboxylate (764 mg.), 2 ml. of hydrogen peroxide (30 percent), and 40 ml. of acetic acid are heated on the steam bath (80°C.) for 90 minutes. Tlc indicates the absence of starting material. The mixture is diluted with 60 ml. of hot water, and the mixture is cooled, the solid is filtered off and dried to give methyl 7-methyl-sulfonylanthrone-2-carboxylate which can be recrystallized from acetic acid/water.

Methyl 7-methylsulfonylanthrone-2-carboxylate (660 mg.), 1 g. of potassium hydroxide, and 60 ml. of 80 percent aqueous ethanol are refluxed for 30 minutes. The mixture is filtered, acidified, and the solid filtered off to give 7-methylsulfonyl-anthrone-2-carboxylic acid.

Likewise, from the respective starting compounds are prepared the following compounds:
7-ethylsulfonylanthrone-2-carboxylic acid,
7-n-propylsulfonylanthrone-2-carboxylic acid,
7-isopropylsulfonylanthrone-2-carboxylic acid,
7-n-butylsulfonylanthrone-2-carboxylic acid,
7-sec-butylsulfonylanthrone-2-carboxylic acid,
7-isobutylsulfonylanthrone-2-carboxylic acid,
7-t-butylsulfonylanthrone-2-carboxylic acid,
7-n-pentylsulfonylanthrone-2-carboxylic acid,
10-methyl-7-methylsulfonylanthrone-2-carboxylic acid,
10-methyl-7-ethylsulfonylanthrone-2-carboxylic acid,
10-methyl-7-n-propylsulfonylanthrone-2-carboxylic acid,
10-methyl-7-isopropylsulfonylanthrone-2-carboxylic acid,
10-methyl-7-n-butylsulfonylanthrone-2-carboxylic acid,
10-methyl-7-sec-butylsulfonylanthrone-2-carboxylic acid,
10-methyl-7-isobutylsulfonylanthrone-2-carboxylic acid,
10-methyl-7-t-butylsulfonylanthrone-2-carboxylic acid,
10-methyl-7-n-pentylsulfonylanthrone-2-carboxylic acid,
10,10-dimethyl-7-ethylsulfonylanthrone-2-carboxylic acid,
10,10-dimethyl-7-n-propylsulfonylanthrone-2-carboxylic acid,
10,10-dimethyl-7-isopropylsulfonylanthrone-2-carboxylic acid,
10,10-dimethyl-7-n-butylsulfonylanthrone-2-carboxylic acid,
10,10-dimethyl-7-sec-butylsulfonylanthrone-2-carboxylic acid,
10,10-dimethyl-7-isobutylsulfonylanthrone-2-carboxylic acid,
10,10-dimethyl-7-t-butylsulfonylanthrone-2-carboxylic acid, and
10,10-dimethyl-7-n-pentylsulfonylanthrone-2-carboxylic acid.

EXAMPLE 14

Methyl 7-methylthioanthrone-2-carboxylate (927 mg.) in 60 ml. of methylene chloride is cooled at 0°C. (ice). m-Chloroperbenzoic acid (555 mg.) is then added and the mixture is stirred at 0°C. for 75 minutes. The reaction mixture is then filtered through alumina and washed with methylene chloride to give methyl 7-methylsulfinylanthrone-2-carboxylate which can be recrystallized from benzene/heptane.

Methyl-7-methylsulfinylanthrone-2-carboxylate (720 mg.) 75 ml. of ethanol, and 10 ml. of 5 percent sodium hydroxide are refluxed for 30 minutes. The mixture is cooled, partially evaporated and acidified. The precipitate is filtered off, washed and dried to give 7-methylsulfinylanthrone-2-carboxylic acid which can be recrystallized from acetic acid.

Likewise from the respective starting compounds are prepared the following compounds:
7-ethylsulfinylanthrone-2-carboxylic acid,
7-n-propylsulfinylanthrone-2-carboxylic acid,
7-isopropylsulfinylanthrone-2-carboxylic acid,
7-n-butylsulfinylanthrone-2-carboxylic acid,
7-sec-butylsulfinylanthrone-2-carboxylic acid,
7-isobutylsulfinylanthrone-2-carboxylic acid,
7-t-butylsulfinylanthrone-2-carboxylic acid,
7-n-pentylsulfinylanthrone-2-carboxylic acid,
10-methyl-7-ethylsulfinylanthrone-2-carboxylic acid,
10-methyl-7-n-propylsulfinylanthrone-2-carboxylic acid,
10-methyl-7-isopropylsulfinylanthrone-2-carboxylic acid,
10-methyl-7-n-butylsulfinylanthrone-2-carboxylic acid,
10-methyl-7-sec-butylsulfinylanthrone-2-carboxylic acid,
10-methyl-7-isobutylsulfinylanthrone-2-carboxylic acid,
10-methyl-7-t-butylsulfinylanthrone-2-carboxylic acid,
10-methyl-7-n-pentylsulfinylanthrone-2-carboxylic acid,
10,10-dimethyl-7-methylsulfinylanthrone-2-carboxylic acid,
10,10-dimethyl-7-ethylsulfinylanthrone-2-carboxylic acid,
10,10-dimethyl-7-n-propylsulfinylanthrone-2-carboxylic acid,
10,10-dimethyl-7-isopropylsulfinylanthrone-2-carboxylic acid,
10,10-dimethyl-7-n-butylsulfinylanthrone-2-carboxylic acid,
10,10-dimethyl-7-sec-butylsulfinylanthrone-2-carboxylic acid,
10,10-dimethyl-7-isobutylsulfinylanthrone-2-carboxylic acid,
10,10-dimethyl-7-t-butylsulfinylanthrone-2-carboxylic acid, and
10,10-dimethyl-7-n-pentylsulfinylanthrone-2-carboxylic acid.

The procedures of examples 13 and 14 can be practiced upon the corresponding acid starting compounds to give the same products without the need of the hydrolysis step.

EXAMPLE 15

One gram of 7-mercaptoanthrone-2-carboxylic acid is dissolved in 30 ml. of acetic acid containing 3 ml. of concentrated hydrochloric acid under warming. The solution is then saturated with chlorine gas and stirred at room temperature overnight. The solution is then diluted with water and the precipitate filtered off, washed, and dried to give 7-chlorosulfonylanthrone-2-carboxylic acid.

Likewise, 10-methyl-7-chlorosulfonylanthrone-2-carboxylic acid is prepared.

The thus prepared chlorosulfonyl compounds are then treated with aqueous potassium hydroxide to give 7-sulfo-anthrone-2-carboxylic acid and 10-methyl-7-sulfoanthrone-2-carboxylic acid.

EXAMPLE 16

A mixture of 1 g. of 7-chlorosulfonylanthrone-2-carboxylic acid, 2 ml. of concentrated aqueous ammonia, and 20 ml. of dioxane is stirred at room temperature overnight. The mixture is then diluted with water and the solid filtered off and dried to give 7-sulfamoylanthrone-2-carboxylic acid.

In like manner, 10-methyl-7-sulfamoylanthrone-2-carboxylic acid is prepared.

Upon substituting a primary amine, such as methylamine and ethylamine, or a secondary amine, such as dimethylamine and diethylamine, for ammonia in the above method, the corresponding C-7 N-monolower alkylsulfamoyl and N,N-dilower alkylsulfamoyl products are obtained, e.g.,:
7-methylsulfamoylanthrone-2-carboxylic acid,
7-ethylsulfamoylanthrone-2-carboxylic acid,
7-n-propylsulfamoylanthrone-2-carboxylic acid,
7-isopropylsulfamoylanthrone-2-carboxylic acid,
7-dimethylsulfamoylanthrone-2-carboxylic acid,
7-diethylsulfamoylanthrone-2-carboxylic acid,
7-di-n-propylsulfamoylanthrone-2-carboxylic acid,
7-di-n-isopropylsulfamoylanthrone-2-carboxylic acid, and the corresponding 8 compounds in each of the 10-methyl and 10,10-dimethyl series.

EXAMPLE 17

Aluminum chloride (15 g.) is added position-wise to a stirred, ice-cooled solution of 15.8 g. of 4-fluorobenzoylchloride and 11.8 g. of m-xylene in 160 ml. dichloroethane. This mixture is stirred at room temperature for 4 hours, decomposed with ice/HCl, washed with water and dried over magnesium sulfate. After removal of the solvent, the residue is distilled under reduced pressure to give 1,3-dimethyl-4-(p-fluorobenzoyl)-benzene.

A mixture of 85 g. of 1,3-dimethyl-4-(p-fluorobenzoyl)-benzene, 300 g. of potassium permanganate, 500 ml. of t-butanol, and 750 ml. of water is heated to the boiling point and maintained thereat for a period of 3 hours. After distilling off the t-butanol, the reaction mixture is filtered, the clear filtrate acidified and the precipitate of 1,3-di-carboxy-4-(p-fluorobenzoyl)-benzene is isolated by suction filtration and washed with water.

A mixture of 35 g. of 1,3-dicarboxy-4-(p-fluorobenzoyl)-benzene, 5 g. red phosphorous, 50 ml. of 47 percent hydroiodic acid and 300 ml. acetic acid is refluxed for 18 hours. The mixture is filtered while still hot, diluted with water and cooled. The precipitate is filtered off, washed with water and dried to give 1,3-dicarboxy-4-(p-fluorobenzyl)-benzene.

1,3-Dicarboxy-4-(p-fluorobenzyl)-benzene (22.8 g.) is heated at 80°C. with 200 ml. conc. sulfuric acid. After cooling the mixture, it is poured into ice. The resulting suspension is heated on a steam bath for 1 hour, cooled, and 7-fluoroanthrone-2-carboxylic acid is isolated by suction filtration.

In like manner, the following compounds are prepared:
7-chloroanthrone-2-carboxylic acid,
7-bromoanthrone-2-carboxylic acid,
7-iodoanthrone-2-carboxylic acid, and
7-trifluoromethylanthrone-2-carboxylic acid.

EXAMPLE 18

The products of example 17 are subjected to the procedures of examples 5, 6, 7, 9 and 10 to give the corresponding 10-alkyl, 10,10-alkylene, and 10,10-dialkyl products, e.g.:
  10-methyl-7-fluoroanthrone-2-carboxylic acid,
  10-methyl-7-trifluoromethylanthrone-2-carboxylic acid,
  10-methyl-7-chloroanthrone-2-carboxylic acid,
  10-ethyl-7-trifluoromethylanthrone-2-carboxylic acid,
  10,10-dimethyl-7-fluoroanthrone-2-carboxylic acid,
  10,10-dimethyl-7-chloroanthrone-2-carboxylic acid,
  10-methyl-10-ethyl-7-trifluoromethylanthrone-2-carboxylic acid, and so forth.

EXAMPLE 19

7-Bromoanthrone-2-carboxylic acid (31.7 g.) and 9.8 g. cuprous cyanide are refluxed in 300 ml. dimethylformamide for 6 hours. The mixture is then cooled to 80°C, and a solution of 50 g. of ferric chloride in 200 ml. 2N hydrochloric acid is added. After stirring at 60°C for one hour, the dark solution is diluted with hot water, cooled, and the precipitate filtered off to give 7-cyanoanthrone-2-carboxylic acid, which can be recrystallized from acetic acid.

7-Cyanoanthrone-2-carboxylic acid (4.8 g.) is refluxed in 12 ml. thionyl chloride for 1 hour. After this period of time, excess reagent is removed in vacuo and the residue evarporated several times with dry benzene. The crude acid chloride thus obtained is dissolved in 40 ml. dioxane and combined with a solution of 2.6 g. dimethyl cadmium in 25 ml. of benzene. After standing at room temperature overnight, the mixture is poured into dilute hydrochloric acid and extracted with ethyl acetate to give 7-acetyl-2-cyano anthrone which can be recrystallized from ethanol.

A mixture of 3.9 g. of 7-acetyl-2-cyanoanthrone, 30 ml. 50 percent sulfuric acid and 60 ml. acetic acid is refluxed for 6 hours. After diluting with water and cooling, the precipitate is collected on a sintered glass funnel and recrystallized from acetic acid to give 7-acetylanthrone-2-carboxylic acid.

In like manner, the following compounds are prepared:
  7-propionylanthrone-2-carboxylic acid,
  7-butyrylanthrone-2-carboxylic acid,
  7-pentanoylanthrone-2-carboxylic acid,
  7-hexanoylanthrone-2-carboxylic acid,
  10-methyl-7-acetylanthrone-2-carboxylic acid,
  10-ethyl-7-acetylanthrone-2-carboxylic acid,
  10-n-propyl-7-acetylanthrone-2-carboxylic acid,
  10-methyl-7-propionylanthrone-2-carboxylic acid,
  10-ethyl-7-propionylathrone-2-carboxylic acid,
  10,10-dimethyl-7-acetylanthrone-2-carboxylic acid,
  10,10-dimethyl-7-propionylanthrone-2-carboxylic acid,
  10,10-diethyl-7-pentanoylanthrone-2-carboxylic acid,
  and so forth.

EXAMPLE 20

A mixture of 1.077 g. of 7-acetylanthrone-2-carboxylate 200 mg. of sodium borohydride and 150 ml. of tetrahydrofuran is stirred for 2.5 hours at room temperature. The reaction is monitored by tlc. After this period of time, a 5 percent aqueous acetic acid solution is added to the reaction mixture dropwise to neutrality and the resultant solution evaporated under vacuum and crystallized by the addition of ethanol and hot water. The precipitate is filtered off, washed and dried to give 7-(1-hydroxyethyl)-anthrone-2-carboxylate.

The foregoing procedures are practiced upon the other 7-acyl compounds prepared as described in example 19 to give the following products:
  7-(1-hydroxy-n-propyl)-anthrone-2-carboxylic acid,
  7-(1-hydroxy-n-butyl)-anthrone-2-carboxylic acid,
  7-(1-hydroxy-n-pentyl)-anthrone-2-carboxylic acid,
  7-(1-hydroxy-n-hexyl)-anthrone-2-carboxylic acid,
  10-methyl-7-(1-hydroxyethyl)-anthrone-2-carboxylic acid,
  10-ethyl-7-(1-hydroxyethyl)-anthrone-2-carboxylic acid,
  10-n-propyl-7-(1-hydroxyethyl)-anthrone-2-carboxylic acid,
  10-methyl-7-(1-hydroxy-n-propyl)-anthrone-2-carboxylic acid,
  10-ethyl-7-(1-hydroxy-n-propyl)-anthrone-2-carboxylic acid,
  10,10-dimethyl-7-(1-hydroxyethyl)-anthrone-2-carboxylic acid,
  10,10-dimethyl-7-(1-hydroxy-n-propyl)-anthrone-2-carboxylic acid,
  10,10-diethyl-7-(1-hydroxypentyl)-anthrone-2-carboxylic acid, and so forth.

EXAMPLE 21

A mixture of 3.6 grams of anthrone-2-carboxylic acid, 10 g. of methyl iodide, and 10 g. of lithium carbonate in 75 ml. of dimethylformamide is stirred at room temperature for a period of 18 hours. After this period of time, the reaction mixture is poured into dilute hydrochloric acid-ice and the resultant precipitate is filtered off and washed to give methyl anthrone-2-carboxylate.

The foregoing procedure is repeated using the alternate lower alkyl iodides so as to prepare the corresponding lower alkyl acid esters hereof, e.g.:
  ethyl anthrone-2-carboxylate,
  n-propyl anthrone-2-carboxylate,
  isopropyl anthrone-2-carboxylate,
  n-butyl anthrone-2-carboxylate,
  isobutyl anthrone-2carboxylate,
  sec-butyl anthrone-2-carboxylate,
  n-pentyl anthrone-2-carboxylate, and so forth.

In like manner, the other anthrone-2-carboxylic acids thereof containing substituents at the C-10 or C-7 positions, prepared as described above, can be converted to the corresponding acid ester, e.g., methyl 10-methylanthrone-2-carboxylate, methyl-10-ethylanthrone-2-carboxylate, methyl 10,10-dimethylanthrone-2-carboxylate, methyl 7-methylanthrone-2-carboxylate, methyl 7-isopropylanthrone-2-carboxylate, methyl 7-isopropoxy-anthrone-2-carboxylate, methyl 10-methyl-7-isopropoxyanthrone-2-carboxylate, and so forth.

EXAMPLE 22

To a solution of 10 grams of 7-methylanthrone-2-carboxylic acid in 200 ml. of ethanol is added the theoretical amount of sodium hydroxide dissolved in 200 ml. of 90 percent ethanol. The reaction mixture is then concentrated in vacuum to give sodium 7-methylanthrone-2-carboxylate.

Sodium 7-isopropylanthrone-2-carboxylic acid and sodium 7-isopropoxyanthrone-2-carboxylic acid are also thus prepared.

In a similar manner, the potassium and lithium salts are prepared. Similarly, by replacing the sodium salt by means of an appropriate metal salt reagent, e.g., calcium chloride, magnanese chloride, and so forth, the other anthrone-2-carboxylic acid salts are prepared, e.g.,:

magnesium 7-methylanthrone-2-carboxylate,
calcium 7-methylanthrone-2-carboxylate,
aluminum 7-methylanthrone-2-carboxylate,
ferrous 7-methylanthrone-2-carboxylate, zinc 7-methylanthrone-2-carboxylate,
magnesium 7-methylanthrone-2-carboxylate,
ferric 7-methylanthrone-2-carboxylate, and so forth.

In a similar manner, the salts of the other C-10 and C-7 substituted anthrone-2-carboxylic acids hereof are prepared.

EXAMPLE 23

To a mixture of 50 milliliters of concentrated aqueous ammonia in 500 ml. of methanol there are added 20 g. of 7-isopropylanthrone-2-carboxylic acid. The resultant mixture is stirred for two hours and is then evaporated to dryness to give the ammonium salt of 7-isopropylanthrone-2-carboxylic acid.

A solution of 10 g. of anthrone-2-carboxylic acid in 50 ml. of thionyl chloride is heated at reflux for one hour. Thereafter, the solution is evaporated to dryness to give the corresponding acid chloride to which is added a concentrated ethereal ammonia solution. The resultant solution is evaporated giving the ammonium salt of anthrone-2-carboxylic acid.

In like manner, the lower alkyl amides can be prepared using monoalkylamine or dialkylamine in lieu of ammonia in the above procedures. Thus prepared, e.g., are:

7-propylanthrone-2-carboxylic acid amide,
N-methyl 7-n-propoxyanthrone-2-carboxylic acid amide,
N,N-dimethyl 10-ethylanthrone-2-carboxylic acid amide,
N,N-diethyl 7-ethylanthrone-2-carboxylic acid amide,
N-ethyl 7-methylanthrone-2-carboxylic acid amide,
N-n-propyl 7-isopropoxyanthrone-2-carboxylic acid amide, and so forth.

EXAMPLE 24

To a mixture of 20 grams of procaine and 500 ml. of aqueous methanol are added 20 g. of 7-isopropoxyanthrone-2-carboxylic acid. The resultant mixture is stirred at room temperature for 16 hours. It is then evaporated under reduced pressure to give the procaine salt of 7-isopropoxyanthrone-2-carboxylic acid.

Similarly, the lysine, caffeine, and arginine salts thereof are obtained. In like manner, the e.g., procaine, lysine, caffeine, and arginine salts of the other 10- and 7-substituted anthrone-2-carboxylic acids are obtained, e.g.,:

the procaine salt of 7-methylanthrone-2-carboxylic acid,
the caffeine salt of 10-isopropylanthrone-2-carboxylic acid,
the lysine salt of 7-ethylanthrone-2-carboxylic acid,
the procaine salt of 7-hydroxymethylanthrone-2-carboxylic acid, and
the arginine salt of 7-isopropylanthrone-2-carboxylic acid.

EXAMPLE 25

The following procedures illustrate the method by which the phramaceutical compositions of the compounds hereof are prepared.

Sodium chloride (0.44 grams) is dissolved in 80 ml. of a (9.47 g/l. water) sodium hydrogen phosphate solution. A sodium dihydrogen phosphate (8.00 g/l. water) solution (20 ml.) is then added thereto. The resultant solution having a pH of 7.38 is sterilized in an autoclave. This vehicle is then added to solid, dry 7-methylanthrone-2-carboxylic acid to give a preparation suitable for intravenous injection containing 2.5 mg. of 7-methylanthrone-2-carboxylic acid per milliliter of total composition.

EXAMPLE 26

The following procedure illustrates a test procedure for the compounds hereof.

Normal female (Sprague-Dawley) rats of 150 to 200 grams each are passively sensitized intradermally by injection of rat anti-egg albumin reaginic sera. After 24 hours, each rat is challenged intravenously with 1.75 ml. of 0.4 percent Evans blue, 1 mg. egg albumin plus 10.0 mg. of 7-isopropylanthrone-2-carboxylic acid. Control rats receive no 7-isopropylanthrone-2-carboxylic acid. The dermal bluing is recorded 15 to 25 minutes later. The rats which receive the anthrone-2-carboxylic acid exhibit a 100 percent inhibition of allergic reaction whereas the control rats exhibit no inhibition.

The above procedure is repeated using 7-methoxyanthrone-2-carboxylic acid, with similar results. The above procedure is repeated using oral administration, with similar results.

Anthrone-2-carboxylic acid compounds are administered by gavage at a dose of 20 mg. per animal 15 minutes prior to challenge. Twenty to thirty minutes after challenge the degree of dermal bluing is read, with similar results.

EXAMPLE 27

A dosage of 100 mg. per kg. of body weight of anthrone-2-carboxylic acid is given intraperitoneally to guinea pigs. Other pigs are left untreated to serve as controls. After treatment, the treated pigs and the controls are exposed to an aqueous spray of 0.05 percent histamine diphosphate (calc. as base), delivered by a nebulizer, until they exhibit a loss of righting ability. During exposure they are observed for severity of reaction. This ranges from slightly deeper breathing to deep breathing to preconvulsive gasping and ataxia to collapse. The pigs which receive the anthrone-2carboxylic acid exhibit a significant resistance to the histamine aerosol challenge, whereas all control pigs collapse within the exposure time.

The trachea of a recently sacrificed guinea pig is removed by disection and cut between the segments of cartilege into rings containing tracheal muscle which are tied to form a 180° alternating smooth muscle tracheal chain. The thus produced continuous length of smooth muscle is mounted in a tissue bath maintained at 37°C with the upper end attached to a linear motion transducer which in turn is connected to a recorder. The responses of a standard, aminophylline, and thioxanthone-2-carboxylic acid are compared after introducing each separately into the bath in various amounts or concentrations. The results show a significant degree of relaxation of the tracheal chain with the test compound.

Inhibition of reaginic antigen-antibody reactions in rats is regarded as representative of inhibition of human reaginic antigen-antibody reactions which occur during allergic episodes. Protection against histamine aerosol inducted bronchoconstriction and relaxation of isolated tracheal chain, as described above, is regarded as representative of and translatable to human bronchopulmonary activity including bronchodilator activity. For example, human subjects suffering from asthma or other bronchopulmonary disorders are studied as to severity of bronchospasm and changes in severity by observable and measurable changes in expiratory function. Such measurements include quantitation of expiratory pulmonary air flow, measurable by such instruments as peak flow meter, and comparison of pulmonary volumes before and after treatment with the subject compounds hereof, as measured by spirometric and/or plethysmographic methods. Subjective relief of the sysptoms upon administration of the compounds hereof is evidenced by improvements in dyspnea, wheezing, cough and expectorated sputum.

What is claimed is:

1. A compound selected from those represented by the following formulas:

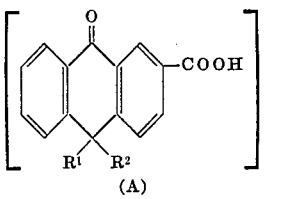
(A)

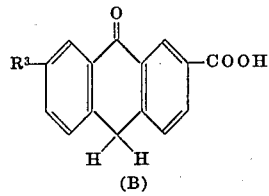
(B)

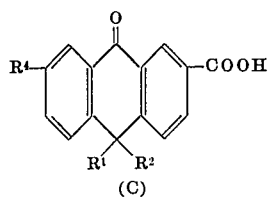
(C)

and the pharmaceutically acceptable, non-toxic lower alkyl, 2-hydroxyethyl or 2,3-dihydroxypropyl esters, unsubstituted, mono(lower)alkyl, di(lower)alkyl dialkylaminoalkyl, alkoxyalkyl, or phenylethyl substituted amides and salts thereof; wherein one of $R^1$ and $R^2$ is hydrogen and the other of $R^1$ and $R^2$ is a lower alkyl group or each of $R^1$ and $R^2$ is a lower alkyl group or $R^1$ and $R^2$ taken together is ethylene, 1,3-propylene, 1,4-butylene, or 1,5-pentylene;

$R^3$ is cycloalkyl containing 3 to 6 carbon atoms, cycloalkoxy containing 3 to 6 carbon atoms, trifluoromethyl, or a group of the formulas:

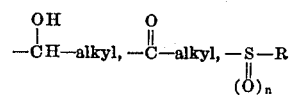

in which in the groups

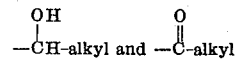

the alkyl group contains from 1 to 5 carbon atoms, $n$ is the integer 1 or 2, R is lower alkyl when $n$ is 1 and R is amino, monolower alkylamino, or dilower alkylamino when $n$ is 2; and $R^4$ is hydrogen, halo, or a group defined by $R^3$; with the proviso that $R^4$ is not hydrogen when one of $R^1$ and $R^2$ is hydrogen and the other of $R^1$ and $R^2$ is a lower alkyl group or each of $R^1$ and $R^2$ is a lower alkyl group.

2. The compound according to claim 1 of Formula (B).

3. The acid compound according to claim 2 wherein $R^3$ is methylsulfinyl; 7-methylsulfinylanthrone-2-carboxylic acid.

4. The compound according to claim 1 of Formula (C).

5. The compound according to claim 4 wherein $R^4$ is methylsulfinyl.

6. The acid compound according to claim 5 wherein $R^1$ is methyl and $R^2$ is hydrogen; 10-methyl-7-methylsulfinyl-anthrone-2-carboxylic acid.

7. The acid compound according to claim 5 wherein each of $R^1$ and $R^2$ is methyl; 10,10-dimethyl-7-methylsulfinylanthrone-2-carboxylic acid.

8. The sodium salts of the compounds according to claim 1.

9. A compound selected from those represented by the formula

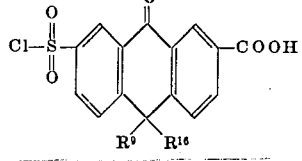

wherein each of $R^9$ and $R^{10}$ is hydrogen, lower alkyl, or when taken together ethylene, 1,3-propylene, 1,4-butylene, or 1,5-pentylene.

10. A compound according to claim 9 which is 7-, chloro-sulfonylanthrone-2-carboxylic acid.

* * * * *